Figure 1:
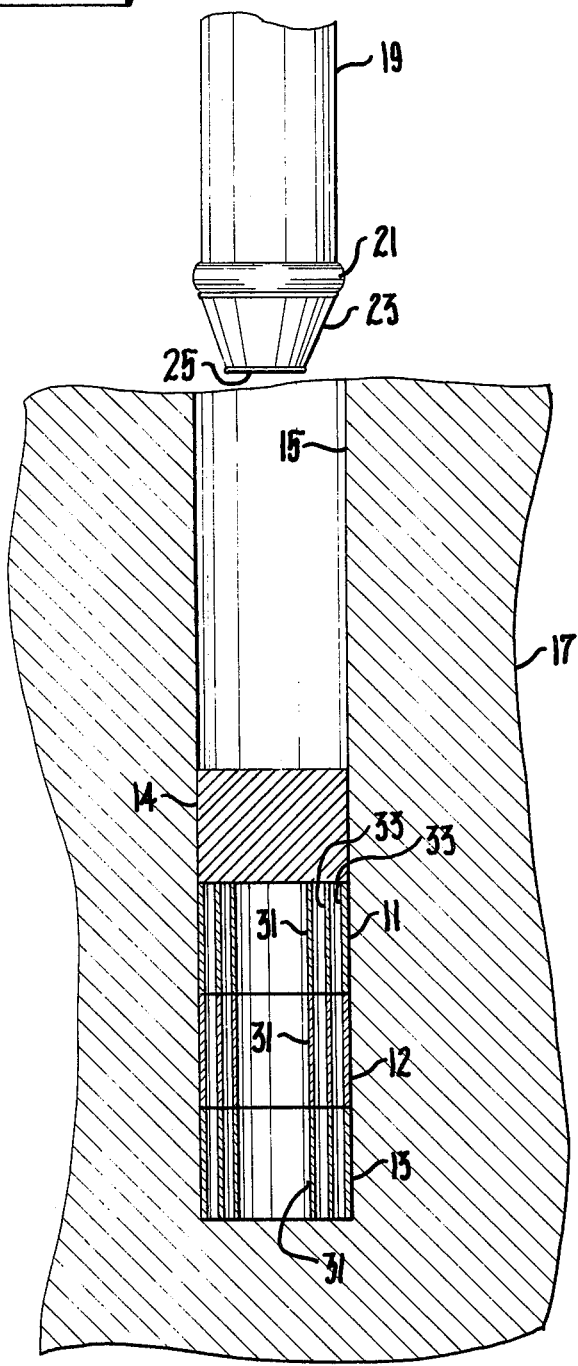

United States Patent [19]

Housman

[11] 4,104,118
[45] Aug. 1, 1978

[54] SHOCK ABSORBER

[75] Inventor: Joseph J. Housman, Del Mar, Calif.

[73] Assignee: General Atomic Company, San Diego, Calif.

[21] Appl. No.: 635,749

[22] Filed: Nov. 26, 1975

[51] Int. Cl.² .............................................. G21C 9/00
[52] U.S. Cl. .................................. 176/38; 176/36 R
[58] Field of Search ........................... 176/36, 38, 87; 188/1 C

[56] References Cited

U.S. PATENT DOCUMENTS

| 3,010,540 | 11/1961 | Dahlew ................................. 188/1 C |
| 3,096,268 | 7/1963 | Lindsay et al. ......................... 176/36 |
| 3,219,539 | 11/1965 | Webb et al. ......................... 176/36 R |
| 3,305,452 | 2/1967 | Remoleur ................................ 176/38 |
| 3,552,525 | 1/1971 | Schudel ............................... 188/1 C |

FOREIGN PATENT DOCUMENTS 1,087,217  10/1967  United Kingdom ................... 176/36 S Primary Examiner—Samuel W. Engle
Assistant Examiner—S. A. Cangialosi
Attorney, Agent, or Firm—Fitch, Even, Tabin & Luedeka

[57] ABSTRACT

A shock absorber is described for use in a hostile environment at the end of a blind passage for absorbing impact loads. The shock absorber includes at least one element which occupies the passage and which is comprised of a porous brittle material which is substantially non-degradable in the hostile environment. A void volume is provided in the element to enable the element to absorb a predetermined level of energy upon being crushed due to impact loading.

6 Claims, 2 Drawing Figures

U.S. Patent  Aug. 1, 1978  4,104,118

SHOCK ABSORBER

This invention relates generally to shock absorbers and, more particularly, to an improved shock absorber suitable for use in a hostile environment in which the shock absorber will retain its energy absorbing qualities without substantial degradation.

Certain types of shock absorbers are designed to absorb the energy of a falling body upon impact to prevent excessive damage to the body. One example of such a device is the type of shock absorber used at the end of a blind passage in a nuclear reactor core structure for absorbing the energy of a falling control rod during emergency shut-down of the reactor core. Typical prior art shock absorbers used in nuclear reactor structures are fabricated from metal and absorb impact energy by plastic deformation of thin walled metal components.

In a hostile environment, such as in or near the core of a nuclear reactor, high levels of radiation or the presence of certain chemicals can cause degradation of the shock absorbing qualities of typical prior art shock absorbers. For example, many metals undergo embrittlement after they are exposed to radiation for a prolonged period of time. As a result, frequent replacement of the shock absorbers has often been necessary, with a consequent loss of time due to reactor shut-down.

Accordingly, it is an object of the present invention to provide a shock absorber for use in a hostile environment which is not subject to degradation therein.

A further object of the invention is to provide an improved shock absorber particularly suited for use at the end of a blind control rod passage in a nuclear reactor core structure for absorbing the impact load of a falling control rod.

A more general object of the invention is to provide an improved shock absorber for use in a hostile environment at the end of a blind passage for absorbing impact loads.

Figure 2:
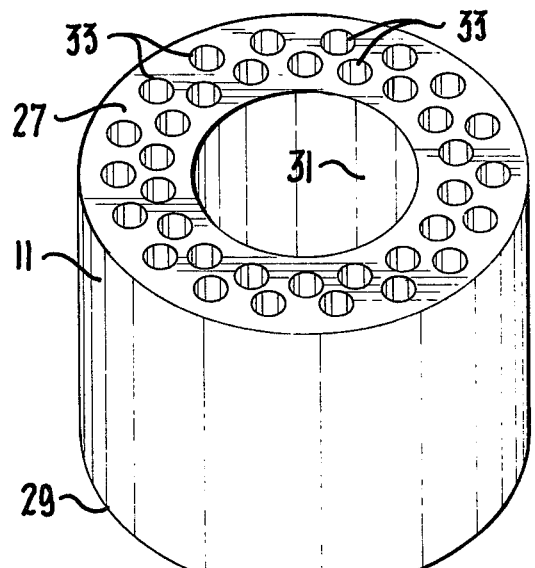

Other objects of the invention will become apparent to those skilled in the art from the following description, taken in connection with the accompanying drawings wherein:

FIG. 1 is a full section view of a portion of a nuclear reactor core structure employing the invention and illustrating the lower portion of a control rod used in the reactor core; and FIG. 2 is a perspective view of a shock absorber element used in the invention.

Very generally, the shock absorber of the invention comprises at least one element 11 having a lateral size sufficient to occupy a substantial portion of the cross-sectional area of the blind passage in which it is used. The longitudinal size of the element is sufficient to extend axially in the passage a predetermined distance. The element is comprised of a porous brittle material which is substantially non-degradable in the hostile environment. The element has a void volume therein of a magnitude and configuration corresponding to a predetermined level of energy absorption by the element upon being crushed during impact loading.

Referring now more particularly to the drawings, the element 11 is shown therein in FIG. 1 employed in a shock absorber which also includes elements 12, 13, and 14. The elements are positioned in a stack at the bottom of a blind passage 15 in a reactor core structure indicated generally at 17.

As is known in the art, the control rod passage 15 may extend through the reactor core structure 17 including that portion of which is comprised at least partially of fissionable material. The control rod is indicated generally at 19 and includes an elongated graphite structure which may be comprised of a series of flexibly connected elements. The control rod 19 terminates in an annulus 21 of slightly enlarged diameter for guiding the control rod in the passage 15, and a frustoconical section or nose 23, terminating in a flat end 25 of circular outline. Other suitable configurations of the control rod and, in particular, its end, will be readily apparent to those skilled in the art and it is contemplated that various configurations may be used in accordance with the invention so long as they are capable of transmitting to and distributing in the shock absorber at the bottom of the blind passage, the energy of the falling control rod.

The elements 11, 12 and 13 are each, in the illustrated embodiment, of identical construction and therefore only the element 11 is illustrated in FIG. 2. The element 11 is of substantially cylindrical configuration, havig two opposite and parallel end surfaces 27 and 29 of circular outline. The size of the element 11 is sufficient to occupy a substantial portion of the cross-sectional area of the passage 15. In the illustrated embodiment, the passage 15 is of circular cross-section and the axis of the cylindrical element 11 is coincident with the axis of the passage 15. In a case where the passage 15 is approximately 4 inches (10 cm.) in diameter, it has been found that a diametral clearance of approximately 0.1 inch provide satisfactory results.

The axial dimension of the element 11 is selected, consistent with the energy absorbing characteristics thereof described in greater detail below, to correspond with the required level of energy absorption to halt the falling control rod 19 as desired. In a control rod passage 15 of approximately 4 inches (10 cm.) in diameter, satisfactory results have been achieved with an axial dimension of approximately 3 inches (7.5 cm.) for each of the elements 11, 12 and 13.

Each of the elements 11, 12 and 13 is provided with a void volume therein. In the illustrated embodiment, the void volume is provided by a central hole 31 drilled on the axis in each element and of approximately 2 inches (5 cm.) in diameter. Surrounding the hole 31 in each element are two rows of smaller diameter holes 33. These holes may, by way of example, be approximately one-fourth inch (0.635 cm) in diameter and the holes in each row may be spaced at about 10° intervals. The resulting 72¼ inch holes provide a void volume which, when added to the void volume provided by the central hole 31, may comprise, for example, from about 30% to about 70% of the total volume occupied by the element 11 in the passage 15. Satisfactory results have been achieved when this volume was approximately 55%.

For the purpose of acting as a ram to transmit energy to the elements 11, 12 and 13, the element 14 remains unvoided, that is, with substantially no void volume. The element 14 contains the same exterior configuration as that of the elements 11, 12 and 13 and is positioned in the stack of elements furthest from the blind end of the passage 15. The solid nature of the element 14 also acts as a plug to prevent the dust and fragments of the crushed cylinder resulting from impact loading from entering the control rod channel 15 and hence from entering any coolant holes and causing blockage thereof for the flow of coolant through the core.

The material of which the elements 11 through 14 are comprised depends, of course, on the operational environment in which they are used. Depending upon the application, the material may be a carbonaceous material, a ceramic material, or a refractory oxide material. For the purpose of absorbing impact loads in the event a reactor control rod is dropped into a graphite moderated nuclear reactor core, carbonaceous material such as carbon or graphite is preferably employed. Successful results have been achieved by using a porous carbon, preferably having a porosity ranging from about 30% to about 70% dense. The ram or element 14 may be of the same porosity, or may be of different porosity, or may be fully dense. Successful results have been achieved with elements fabricated from a 45% dense porous carbon.

When the control rod 19 falls through the passage 15 and strikes the element 14, the impact loading thereof is transferred to the elements 11, 12 and 13. This causes the elements 11, 12 and 13 to fracture and compress and, in so doing, the energy of the falling control rod is absorbed. In actual tests, shock absorbers constructed in accordance with the invention and along the lines as described previously are capable of absorbing impact loads amounting to energy levels of 4,000 ft. lbs.

It may be seen, therefore, that the invention provides an improved shock absorber which is capable of absorbing high energy levels of impact loads and which is not subject to degradation even over long periods of time in hostile environments. Energy absorption is achieved by fracturing and compression. The crush strength, collapse volume and stack height is selected in accordance with the required energy absorption.

Various modifications of the invention in addition to those shown and described herein will become apparent to those skilled in the art from the foregoing description and accompanying drawings. Such modifications are intended to fall within the scope of the appended claims.

What is claimed is:

1. In combination with a nuclear reactor core structure having a blind control rod passage, a shock absorber comprising a plurality of rigid fracturable elements having a lateral size sufficient to occupy a substantial portion of the cross-sectional area of said control rod passage and having a longitudinal size sufficient to extend axially in said passage, said element being positioned in said passage adjacent the blind end thereof, said element being composed solely of a porous brittle carbonaceous material, a porous brittle ceramic material, or a porous brittle refractory oxide, said elements having a plurality of parallel holes extending longitudinally therethrough and parallel with the longitudinal axis of the passage, said holes providing a void volume of between 30% and 70% of the total volume of the elements corresponding to a predetermined level of energy absorption by said elements upon being fractured due to impact loading by a control rod.

2. A combination according to claim 1 wherein the material of which said element is comprised is carbon.

3. A combination according to claim 2 wherein the carbon is porous having a density of between about 30% and about 70%.

4. A combination according to claim 1 wherein said element is substantially cylindrical.

5. A combination according to claim 1 including a further element having no void volume therein positioned furthest away from the blind end of said passage.

6. A combination according to claim 5 including three of said elements and said further element.